US008427705B2

(12) United States Patent
Young et al.

(10) Patent No.: US 8,427,705 B2
(45) Date of Patent: Apr. 23, 2013

(54) MAXIMIZING SPEED TOLERANCE DURING DUAL ENGINE SYNCHRONIZATION

(75) Inventors: Timothy J. Young, Williamson, NY (US); David J. Fuest, Warsaw, NY (US); Ronald W. Stephens, Lima, NY (US); Donald J. Lewandoski, Webster, NY (US)

(73) Assignee: EASTMAN Kodak Company, Rochester, NY (US)

( * ) Notice: Subject to any disclaimer, the term of this patent is extended or adjusted under 35 U.S.C. 154(b) by 973 days.

(21) Appl. No.: 12/470,511

(22) Filed: May 22, 2009

(65) Prior Publication Data

US 2010/0296128 A1 Nov. 25, 2010

(51) Int. Cl.
*H04N 1/40* (2006.01)

(52) U.S. Cl.
USPC .......................................... 358/2.1; 358/468

(58) Field of Classification Search .......... 358/496–498, 358/1.9, 2.1, 296, 468; 399/195, 367, 372–373, 399/388
See application file for complete search history.

(56) References Cited

U.S. PATENT DOCUMENTS

| | | | |
|---|---|---|---|
| 4,965,637 | A | 10/1990 | Katoh et al. |
| 6,144,024 | A | 11/2000 | Rushing |
| 6,222,176 | B1 | 4/2001 | Rushing et al. |
| 6,225,618 | B1 | 5/2001 | Rushing et al. |
| 6,229,972 | B1 | 5/2001 | Rushing |
| 6,331,832 | B1 | 12/2001 | Rushing |
| 6,567,171 | B1 | 5/2003 | Rushing |
| 6,671,052 | B1 | 12/2003 | Rushing |
| 6,791,485 | B1 | 9/2004 | Rushing |
| 7,245,856 | B2 | 7/2007 | Furst et al. |
| 2006/0233569 | A1 | 10/2006 | Furst et al. |
| 2008/0126860 | A1 | 5/2008 | Sampath et al. |

FOREIGN PATENT DOCUMENTS

| | | |
|---|---|---|
| EP | 1 357 446 A2 | 10/2003 |

*Primary Examiner* — Thomas D Lee
*Assistant Examiner* — Stephen M Brinich
(74) *Attorney, Agent, or Firm* — Donna P. Suchy

(57) ABSTRACT

A method of improving the synchronization of the timing of a plurality of physically coupled print engines by detecting and eliminating misleading indications of a non-synchronized print engine that are essentially minimal variations caused by disturbances to the printer such as torque disturbances, power line voltage or frequency variations, etc. using a chosen number of consecutive changes in the time delay to result in the time delay of the receiver being handed off from one engine or module to a sequential engine or module before a machine error is declared. This method notes that a speed variation is sufficiently large or if a signal is reported that a module, operating within its speed specifications but near the end the limit of that specification, had been subjected to a small incremental change in module speed resulting in that module operating outside its specifications and takes corrective actions or not depending on the magnitude and or source of the variation.

20 Claims, 4 Drawing Sheets

MAXIMIZING SPEED TOLERANCE DURING DUAL ENGINE SYNCHRONIZATION

FIELD OF THE INVENTION

This invention relates to a printing system comprising a plurality of coupled electrophotographic print engines. More specifically, it relates to a method of controlling the timing of coupled electrophotographic print engines.

BACKGROUND OF THE INVENTION

In typical commercial reproduction apparatus (electrographic copier/duplicators, printers, or the like), a latent image charge pattern is formed on a primary imaging member (PIM) such as a photoreceptor used in an electrophotographic printing apparatus. While the latent image can be formed on a dielectric PIM by depositing charge directly corresponding to the latent image, it is more common to first uniformly charge a photoreceptive PIM member. The latent image is then formed by area-wise exposing the PIM in a manner corresponding to the image to be printed. The latent image is rendered visible by bringing the primary imaging member into close proximity to a development station. A typical development station may include a cylindrical magnetic core and a coaxial nonmagnetic shell. In addition, a sump may be present containing developer which includes marking particles, typically including a colorant such as a pigment, a thermoplastic binder, one or more charge control agents, and flow and transfer aids such as submicrometer particles adhered to the surface of the marking particles. The submicrometer particles typically include silica, titania, various lattices, etc. The developer also typically includes magnetic carrier particles such as ferrite particles that tribocharge the marking particles and transport the marking particles into close proximity to the PIM, thereby allowing the marking particles to be attracted to the electrostatic charge pattern corresponding to the latent image on the PIM, thereby rendering the latent image into a visible image.

The shell of the development station is typically electrically conducting and can be electrically biased so as to establish a desired difference of potential between the shell and the PIM. This, together with the electrical charge on the marking particles, determines the maximum density of the developed print for a given type of marking particle.

The image developed onto the PIM member is then transferred to a suitable receiver such as paper or other substrate. This is generally accomplished by pressing the receiver into contact with the PIM member while applying a potential difference (voltage) to urge the marking particles towards the receiver. Alternatively, the image can be transferred from the primary imaging member to a transfer intermediate member (TIM) and then from the TIM to the receiver.

The image is then fixed to the receiver by fusing, typically accomplished by subjecting the image bearing receiver to a combination of heat and pressure. The PIM and TIM, if used, are cleaned and made ready for the formation of another print.

A printing engine generally is designed to generate a specific number of prints per minute. For example, a printer may be able to generate 150 single-sided pages per minute (ppm) or approximately 75 double-sided pages per minute with an appropriate duplexing technology. Small upgrades in system throughput may be achievable in robust printing systems. However, the doubling of throughput speed is mainly unachievable without a) purchasing a second reproduction apparatus with throughput identical to the first so that the two machines may be run in parallel, or without b) replacing the first reproduction apparatus with a radically redesigned print engine having double the speed. Both options are very expensive and often with regard to option (b), not possible.

Another option for increasing printing engine throughput is to utilize a second print engine in series with a first print engine. For example, U.S. Pat. No. 7,245,856 discloses a tandem print engine assembly which is configured to reduce image registration errors between a first side image formed by a first print engine, and a second side image formed by a second print engine. Each of the '856 print engines has a seamed photoreceptive belt. The seams of the photoreceptive belt in each print engine are synchronized by tracking a phase difference between seam signals from both belts. Synchronization of a slave print engine to a main print engine occurs once per revolution of the belts, as triggered by a belt seam signal, and the speed of the slave photoreceptor and the speed of an imager motor and polygon assembly are updated to match the speed of the master photoreceptor. Unfortunately, such a system tends to be susceptible to increasing registration errors during each successive image frame during the photoreceptor revolution. Furthermore, given the large inertia of the high-speed rotating polygon assembly, it is difficult to make significant adjustments to the speed of the polygon assembly in the relatively short time frame of a single photoreceptor revolution. This can limit the response of the '856 system on a per revolution basis, and make it even more difficult, if not impossible, to adjust on a more frequent basis.

In general, the timing offset of the first and second engines are determined by paper transport time from image transfer in the first engine to the image transfer in the second engine. If the sheet is inverted between the engines, the transport time can be a function of the receiver length. In order to obtain sufficient timing latitude to compensate for varying receiver sheet sizes, one could run the inverter assembly at a very high rate of speed to minimize the effects of receiver size. Alternatively, one can use the maximum size image frame for all receiver sizes. However, this would significantly reduce productivity.

Color images are made by printing separate images corresponding to an image of a specific color. The separate images are then transferred, in register, to the receiver. Alternatively, they can be transferred in register to a TIM and from the TIM to the receiver or they may be transferred separately to a TIM and then transferred and registered on the receiver. For example, a printing engine assembly capable of producing full color images may include at least four separate print engines or modules where each module or engine prints one color corresponding to the subtractive primary color cyan, magenta, yellow, and black. Additional development modules may include marking particles of additional colorants to expand the obtainable color gamut, clear toner, etc., as are known in the art. The quality of images produced on different print engines can be found to be objectionable if produced on different print engines even if the print engines are nominally the same, e.g. the same model produced by the same manufacturer. For example, the images can have slightly different sizes, densities or contrasts. These variations, even if small, can be quite noticeable if the images are compared closely.

Problems that appear to be due to the print engines being out of synchronization but arising from transient occurrences in a digital print engine comprising coupled digital print engines can occur if the speed of any of the several modules varies, as can occur due to torque disturbances, power line voltage or frequency variations, etc. This can be especially problematic if there is a signal to the logic and control unit (LCU) indicating that a speed variation is sufficiently large or if a signal is reported that a module, operating within its speed specifications but near the end the limit of that specification, had been subjected to a small incremental change in module speed resulting in that module operating outside its specifications. Either of these cases can result in unnecessary changes in the time delay needed to allow the print engines to be synchronized and may actually result in the entire print engine being shut down. These error signals may either indicate a problem that needs correction or simply be a transient or simply data spikes that are not indicative of a problem needing rectification. Moreover, by correcting for the perceived mismatch in timing, the control unit can actually drive the print engines out of synchronization. It is therefore important to verify that a timing error is indeed due to the print engines being out of synchronization rather than due to a fluctuation in the synchronization.

It is clearly important that certain image quality attributes, including size, print density, and contrast, match for prints made on separate print engines if those prints are subject to close scrutiny, as would be the case when a print made on a receiver sheet is produced on separate print engines. Specifically, the reflection density and the contrast of the prints need to closely match or the prints will be found to be objectionable to a customer. Even prints produced on two nominally identical digital printing presses such as electrophotographic printing presses described herein can vary in density and contrast due to variations in the photo-response of the PIM, variations in the charge or size of the marking particles, colorant dispersion variations within the batches of marking particles used in the separate engines, etc. It is clear that a method is needed to allow comparable prints to be produced on a plurality of engines.

SUMMARY OF THE INVENTION

This is a method of improving the synchronization of the timing of a plurality of physically coupled print engines by detecting and eliminating misleading indications of a non-synchronized print engine that are essentially minimal variations caused by disturbances to the printer that can occur due to torque disturbances, power line voltage or frequency variations, etc. This can be especially problematic if there is a signal to the logic and control unit (LCU) indicating that a speed variation is sufficiently large or if a signal is reported that a module, operating within its speed specifications but near the end the limit of that specification, had been subjected to a small incremental change in module speed resulting in that module operating outside its specifications. The method uses a chosen number of consecutive changes in the time delay to result in the time delay of the receiver being handed off from one engine or module to a sequential engine or module before a machine error is declared.

Figure 1:
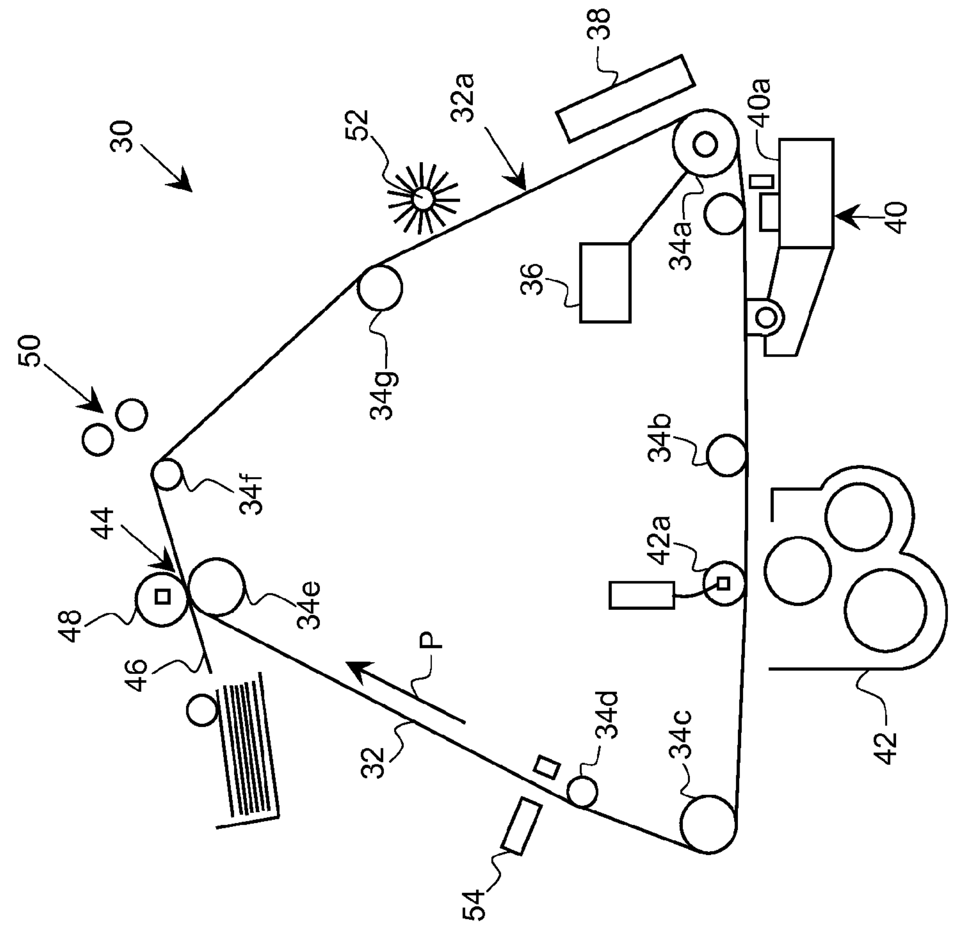
FIG. 1 schematically illustrates an embodiment of an electrophotographic print engine.

It will be appreciated that for purposes of clarity and where deemed appropriate, reference numerals have been repeated in the figures to indicate corresponding features, and that the various elements in the drawings have not necessarily been drawn to scale in order to better show the features.

DETAILED DESCRIPTION OF THE INVENTION

In order to maximize productivity, different image frame sizes are utilized for different size receivers. Generally, the frame sizes are defined as preset portions of a primary imaging member in a printer such as equal portions that are from integral divisors of a primary imaging member (PIM), such as a photoreceptor, used in an electrophotographic engine. While this is often done to avoid a splice in a seemed PIM, it may be desirable for other reasons as well. For example, various process control algorithms may require that specific locations of a PIM be used solely for specific marks related to process control.

Many applications in printing, especially digital printing and more particularly electrophotographic printing require that multiple print engines be sequentially ganged together to maximize printing efficiency. For example, as described in U.S. patent application Ser. Nos. 12/126,192 and 12/126,267, an electrophotographic printer can comprise two similar print engines that have been coupled together. A module termed a productivity module inverts the receiver sheets, thereby allowing the production of duplex images to be formed on a receiver at the full process speed of an individual module, effectively doubling productivity.

To maximize printing efficiency and speed, the smallest frame size possible is generally chosen for a given size receiver. As described in U.S. patent application Ser. Nos. 12/126,192 and 12/126,267, for coupled print engine configurations, the image frames for a slave print engine must be synchronized to those in the master print engine so that sheets are delivered from to the slave engine at the correct time for a specific image frame. As described in U.S. patent application Ser. No. 12/128,897, the image frames must also be delayed to allow for the time required for the receiver to travel from the image transfer location in one engine to the corresponding location in the second engine.

In general, the timing offset of the first and second engines are determined by paper transport time from image transfer in the first engine to the image transfer in the second engine. If the sheet is inverted between the engines, the transport time can be a function of the receiver length. In order to obtain sufficient timing latitude to compensate for varying receiver sheet sizes, one could run the inverter assembly at a very high rate of speed to minimize the effects of receiver size. Alternatively, one can use the maximum size image frame for all receiver sizes. However, this would significantly reduce productivity.

The optimum timing offset that is described in this invention to allow synchronization is a function of the time required to transport the receiver from the image transfer location in the first print engine to that in the second print engine. As the timing offset can vary from printer to printer due to drive roller tolerances, the length or circumference of the photoreceptor, the paper path length, and engine to engine mating variations, it is necessary to provide a means to determine and set the required offset by a field engineer on the specific print engines. This is even more problematic when one is upgrading an existing single module print engine with a second print engine and, perhaps, even an inverter. This invention describes a simple and direct method of fine-tuning this synchronization as described below.

FIG. 1 schematically illustrates an embodiment of an electrophotographic print engine 30. The print engine 30 has a movable recording member such as a photoreceptive belt 32, which is entrained about a plurality of rollers or other supports 34*a* through 34*g*. The photoreceptive belt 32 may be more generally referred-to as a primary imaging member (PIM) 32. A primary imaging member (PIM) 32 may be any charge carrying substrate which may be selectively charged or discharged by a variety of methods including, but not limited to corona charging/discharging, gated corona charging/discharging, charge roller charging/discharging, ion writer charging, light discharging, heat discharging, and time discharging.

One or more of the rollers 34*a*-34*g* are driven by a motor 36 to advance the PIM 32. Motor 36 preferably advances the PIM 32 at a high speed, such as 20 inches per second or higher, in the direction indicated by arrow P, past a series of workstations of the print engine 30, although other operating speeds may be used, depending on the embodiment. In some embodiments, PIM 32 may be wrapped and secured about a single drum. In further embodiments, PIM 32 may be coated onto or integral with a drum.

It is useful to define a few terms that are used in relation to this invention. Optical density is the log of the ratio of the intensity of the input illumination to the transmitted, reflected, or scattered light, or $D=\log(I_i/I_0)$ where D is the optical density, $I_I$ is the intensity of the input illumination, $I_0$ is the intensity of the output illumination, and log is the logarithm to the base 10. Thus, an optical density of 0.3 means that the output intensity is approximately half of the input intensity which is desirable for quality prints.

For some applications, it is preferable to measure the intensity of the light transmitted through a sample such as a printed image. This is referred to as the transmission density and is measured by first nulling out the density of the substrate supporting the image and then measuring the density of the chosen region of the image by illuminating the image through the back of the substrate with a known intensity of light and measuring the intensity of the light transmitted through the sample. The color of the light chosen corresponds to the color of the light principally absorbed by the sample. For example, if the sample consists of a printed black region, white light would be used. If the sample was printed using the subtractive primary colors (cyan, magenta, or yellow), red, green, or blue light, respectively, would be used.

Alternatively, it is sometimes preferable to measure the light reflected or scattered from a sample such as a printed image. This is referred to as the reflection density. This is accomplished by measuring the intensity of the light reflected from a sample such as a printed image after nulling out the reflection density of the support. The color of the light chosen corresponds to the color of the light principally absorbed by the sample. For example, if the sample consists of a printed black region, white light would be used. If the sample was printed using the subtractive primary colors (cyan, magenta, or yellow), cyan, magenta, or yellow light, respectively, would be used.

A suitable device for measuring optical density is an X-Rite densitometer with status A filters. Some such devices measure either transmission or reflected light. Other devices measure both transmission and/or reflection densities. Alternatively, for use within a printing engine, densitometers such as those described by Rushing in U.S. Pat. Nos. 6,567,171, 6,144,024, 6,222,176, 6,225,618, 6,229,972, 6,331,832, 6,671,052, and 6,791,485 are well suited. Other densitometers, as are known in the art, are also suitable.

The size of the sample area required for densitometry measurements varies, depending on a number of factors such as the size of the aperture of the densitometer and the information desired. For example, microdensitomers are used to measure site-to-site variations in density of an image on a very small scale to allow the granularity of an image to be measured by determining the standard deviation of the density of an area having a nominally uniform density. Alternatively, densitometers also are used having an aperture area of several square centimeters. These allow low frequency variations in density to be determined using a single measurement. This allows image mottle to be determined. For simple determinations of image density, the area to be measured generally has a radius of at least 1 mm but not more than 5 mm.

The term module means a device or subsystem designed to perform a specific task in producing a printed image. For example, a development module in an electrophotographic printer would include a primary imaging member (PIM) such as a photoreceptive member and one or more development stations that would image-wise deposit marking or toner particles onto an electrostatic latent image on the PIM, thereby rendering it into a visible image. A module can be an integral component in a print engine. For example, a development module is usually a component of a larger assembly that includes writing transfer and fuser modules such as are known in the art. Alternatively, a module can be self contained and can be made in a manner so that they are attached to other modules to produce a print engine. Examples of such modules include scanners, glossers, inverters that will invert a sheet of paper or other receiver to allow duplex printing, inserters that allow sheets such as covers or preprinted receivers to be inserted into documents being printed at specific locations within a stack of printed receiver sheets, and finishers that can fold, stable, glue, etc. the printed documents.

A print engine includes sufficient modules to produce prints. For example, a black and white electrophotographic print engine would generally include at least one development module, a writer module, and a fuser module. Scanner and finishing modules can also be included if called for by the intended applications.

A print engine assembly, also referred to in the literature as a reproduction apparatus, includes a plurality of print engines that have been integrally coupled together in a manner to allow them to print in a desired manner. For example, print engine assemblies that include two print engines and an inverter module that are coupled together to increase productivity by allowing the first print engine to print on one side of a receiver, the receiver then fed into the inverter module which inverts the receiver and feeds the receiver into the second print engine that prints on the inverse side of the receiver, thereby printing a duplex image.

A digital print engine is a print engine wherein the image is written using digital electronics. Such print engines allow the image to be manipulated, image by image, thereby allowing each image to be changed. In contrast, an offset press relies on the image being printed using press plates. Once the press plate is made, it cannot be changed. An example of a digital print engine is an electrophotographic print engine wherein the electrostatic latent image is formed on the PIM by exposing the PIM using a laser scanner or LED array. Conversely, an electrophotographic apparatus that relies on forming a latent image by using a flash exposure to copy an original document would not be considered a digital print engine.

A digital print engine assembly is a print engine assembly that a plurality of print engines of which at least one is a digital print engine.

Contrast is defined as the maximum value of the slope curve of the density versus log of the exposure. The contrast of two prints is considered to be equal if they differ by less than 0.2 ergs/$cm^2$ and preferably by less than 0.1 ergs/$cm^2$.

Print engine 30 may include a controller or logic and control unit (LCU) (not shown). The LCU may be a computer, microprocessor, application specific integrated circuit (ASIC), digital circuitry, analog circuitry, or a combination or plurality thereof. The controller (LCU) may be operated according to a stored program for actuating the workstations within print engine 30, effecting overall control of print engine 30 and its various subsystems. The LCU may also be programmed to provide closed-loop control of the print engine 30 in response to signals from various sensors and encoders. Aspects of process control are described in U.S. Pat. No. 6,121,986 incorporated herein by this reference.

A primary charging station 38 in print engine 30 sensitizes PIM 32 by applying a uniform electrostatic corona charge, from high-voltage charging wires at a predetermined primary voltage, to a surface 32*a* of PIM 32. The output of charging station 38 may be regulated by a programmable voltage controller (not shown), which may in turn be controlled by the LCU to adjust this primary voltage, for example by controlling the electrical potential of a grid and thus controlling movement of the corona charge. Other forms of chargers, including brush or roller chargers, may also be used.

An image writer, such as exposure station 40 in print engine 30, projects light from a writer 40*a* to PIM 32. This light selectively dissipates the electrostatic charge on photoreceptive PIM 32 to form a latent electrostatic image of the document to be copied or printed. Writer 40*a* is preferably constructed as an array of light emitting diodes (LEDs), or alternatively as another light source such as a Laser or spatial light modulator. Writer 40*a* exposes individual picture elements (pixels) of PIM 32 with light at a regulated intensity and exposure, in the manner described below. The exposing light discharges selected pixel locations of the photoreceptor, so that the pattern of localized voltages across the photoreceptor corresponds to the image to be printed. An image is a pattern of physical light, which may include characters, words, text, and other features such as graphics, photos, etc. An image may be included in a set of one or more images, such as in images of the pages of a document. An image may be divided into segments, objects, or structures each of which is itself an image. A segment, object or structure of an image may be of any size up to and including the whole image.

After exposure, the portion of PIM 32 bearing the latent charge images travels to a development station 42. Development station 42 includes a magnetic brush in juxtaposition to the PIM 32. Magnetic brush development stations are well known in the art, and are desirable in many applications; alternatively, other known types of development stations or devices may be used. Plural development stations 42 may be provided for developing images in plural gray scales, colors, or from toners of different physical characteristics. Full process color electrographic printing is accomplished by utilizing this process for each of four toner colors (e.g., black, cyan, magenta, yellow).

Upon the imaged portion of PIM 32 reaching development station 42, the LCU selectively activates development station 42 to apply toner to PIM 32 by moving backup roller 42*a* and PIM 32, into engagement with or close proximity to the magnetic brush. Alternatively, the magnetic brush may be moved toward PIM 32 to selectively engage PIM 32. In either case, charged toner particles on the magnetic brush are selectively attracted to the latent image patterns present on PIM 32, developing those image patterns. As the exposed photoreceptor passes the developing station, toner is attracted to pixel locations of the photoreceptor and as a result, a pattern of toner corresponding to the image to be printed appears on the photoreceptor. As known in the art, conductor portions of development station 42, such as conductive applicator cylinders, are biased to act as electrodes. The electrodes are connected to a variable supply voltage, which is regulated by a programmable controller in response to the LCU, by way of which the development process is controlled.

Development station 42 may contain a two-component developer mix, which includes a dry mixture of toner and carrier particles. Typically the carrier preferably includes high coercivity (hard magnetic) ferrite particles. As a non-limiting example, the carrier particles may have a volume-weighted diameter of approximately 30μ. The dry toner particles are substantially smaller, on the order of 6μ to 15μ in volume-weighted diameter. Development station 42 may include an applicator having a rotatable magnetic core within a shell, which also may be rotatably driven by a motor or other suitable driving means. Relative rotation of the core and shell moves the developer through a development zone in the presence of an electrical field. In the course of development, the toner selectively electrostatically adheres to PIM 32 to develop the electrostatic images thereon and the carrier material remains at development station 42. As toner is depleted from the development station due to the development of the electrostatic image, additional toner may be periodically introduced by a toner auger (not shown) into development station 42 to be mixed with the carrier particles to maintain a uniform amount of development mixture. This development mixture is controlled in accordance with various development control processes. Single component developer stations, as well as conventional liquid toner development stations, may also be used.

A transfer station 44 in printing machine 10 moves a receiver sheet 46 into engagement with the PIM 32, in registration with a developed image to transfer the developed image to receiver sheet 46. Receiver sheets 46 may be plain or coated paper, plastic, or another medium capable of being handled by the print engine 30. Typically, transfer station 44 includes a charging device for electrostatically biasing movement of the toner particles from PIM 32 to receiver sheet 46. In this example, the biasing device is roller 48, which engages the back of sheet 46 and which may be connected to a programmable voltage controller that operates in a constant current mode during transfer. Alternatively, an intermediate member may have the image transferred to it and the image may then be transferred to receiver sheet 46. After transfer of the toner image to receiver sheet 46, sheet 46 is detacked from PIM 32 and transported to fuser station 50 where the image is fixed onto sheet 46, typically by the application of heat and/or pressure. Alternatively, the image may be fixed to sheet 46 at the time of transfer. A cleaning station 52, such as a brush, blade, or web is also located beyond transfer station 44, and removes residual toner from PIM 32. A pre-clean charger (not shown) may be located before or at cleaning station 52 to assist in this cleaning. After cleaning, this portion of PIM 32 is then ready for recharging and re-exposure. Of course, other portions of PIM 32 are simultaneously located at the various workstations of print engine 30, so that the printing process may be carried out in a substantially continuous manner.

A controller provides overall control of the apparatus and its various subsystems with the assistance of one or more sensors, which may be used to gather control process, input data. One example of a sensor is belt position sensor 54.

Figure 2:
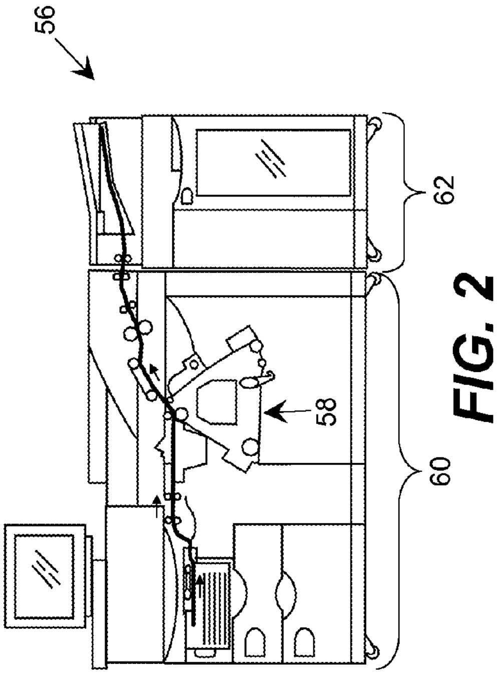
FIG. 2 schematically illustrates an embodiment of a reproduction apparatus having a first print engine.

FIG. 2 schematically illustrates an embodiment of a reproduction apparatus 56 having a first print engine 58 that is capable of printing one or a multiple of colors. The embodied reproduction apparatus will have a particular throughput, which may be measured in pages per minute (ppm). As explained above, it would be desirable to be able to significantly increase the throughput of such a reproduction apparatus 56 without having to purchase an entire second reproduction apparatus. It would also be desirable to increase the throughput of reproduction apparatus 56 without having to scrap apparatus 56 and replacing it with an entire new machine.

Quite often, reproduction apparatus 56 is made up of modular components. For example, the print engine 58 is housed within a main cabinet 60 that is coupled to a finishing unit 62. For simplicity, only a single finishing device 62 is shown, however, it should be understood that multiple finishing devices providing a variety of finishing functionality are known to those skilled in the art and may be used in place of a single finishing device. Depending on its configuration, the finishing device 62 may provide stapling, hole punching, trimming, cutting, slicing, stacking, paper insertion, collation, sorting, and binding.

Figure 3A:
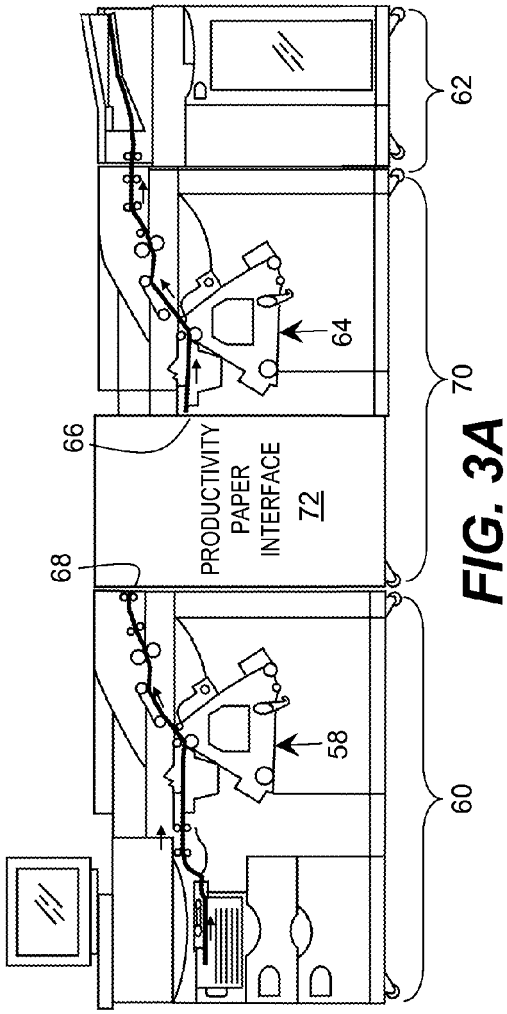
FIGS. 3A-3C schematically illustrate embodiments of a reproduction apparatus having a first print engine and a tandem second print engine from a productivity module.
Figure 3B:
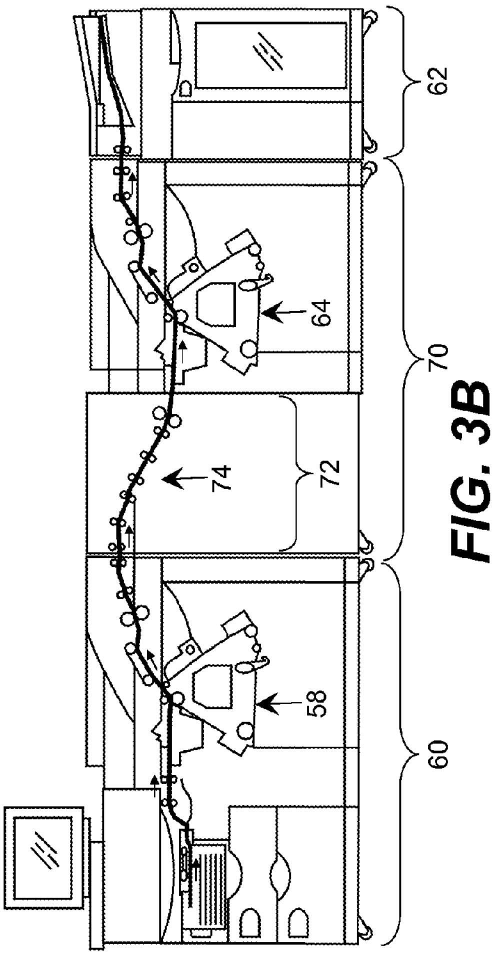
Figure 3C:
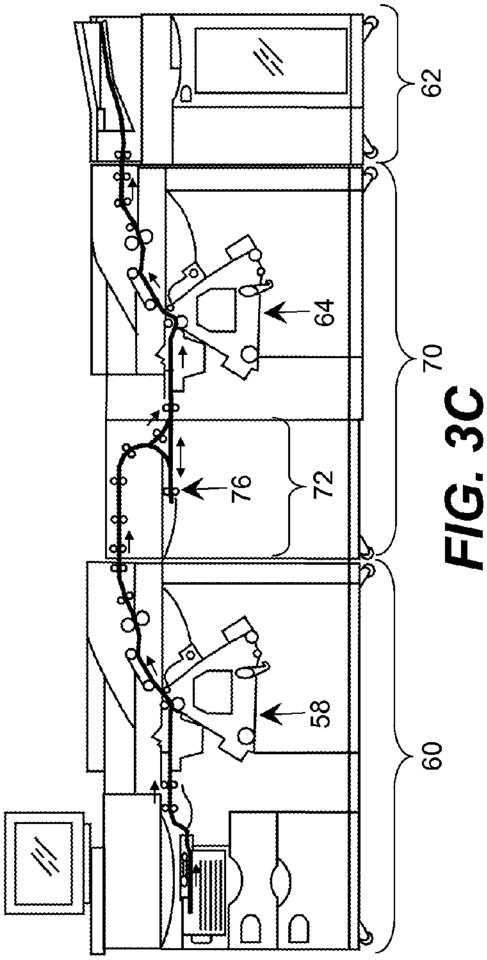

As FIG. 3A schematically illustrates, a second print engine 64 may be inserted in-line with the first print engine 58 and in-between the first print engine 58 and the finishing device 62 formerly coupled to the first print engine 58. The second print engine 64 may have an input paper path point 66 which does not align with the output paper path point 68 from the first print engine 58. Additionally, or optionally, it may be desirable to invert the receiver sheets from the first print engine 58 prior to running them through the second print engine (in the case of duplex prints). In such instances, the productivity module 70 which is inserted between the first print engine 58 and the at least one finisher 62 may have a productivity paper interface 72. Some embodiments of a productivity paper interface 72 may provide for matching 74 of differing output and input paper heights, as illustrated in the embodiment of FIG. 3B. Other embodiments of a productivity paper interface 72 may provide for inversion 76 of receiver sheets, as illustrated in the embodiment of FIG. 3C.

Providing users with the option to re-use their existing equipment by inserting a productivity module 70 between their first print engine 58 and their one or more finishing devices 62 can be economically attractive since the second print engine 64 of the productivity module 70 does not need to come equipped with the input paper handling drawers coupled to the first print engine 58. Furthermore, the second print engine 64 can be based on the existing technology of the first print engine 58 with control modifications which will be described in more detail below to facilitate synchronization between the first and second print engines.

Figure 4:
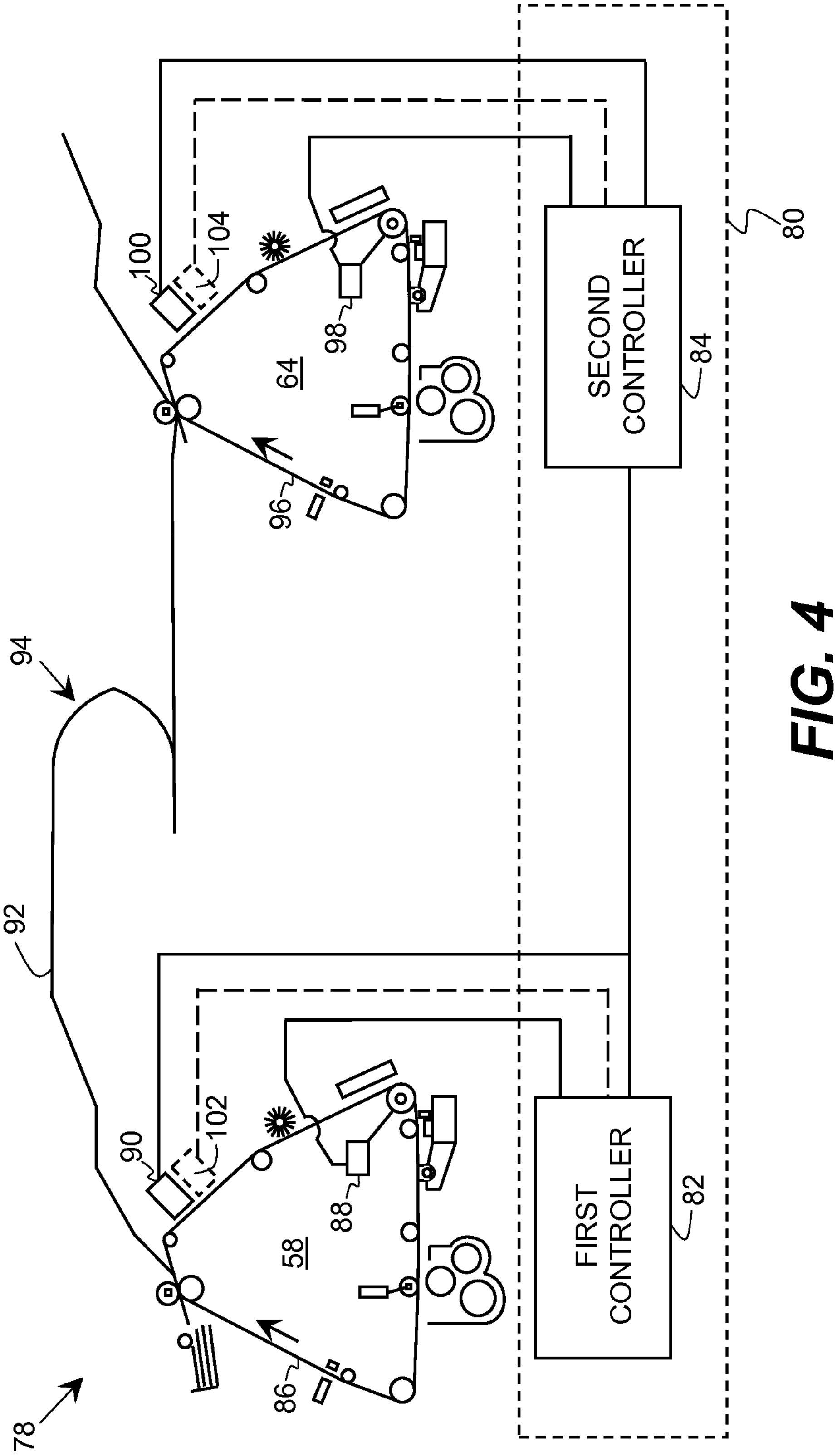
FIG. 4 schematically illustrates an embodiment of a reproduction or printing apparatus having embodiments of a first and second print engine.

FIG. 4 schematically illustrates an embodiment of a reproduction apparatus 78 having embodiments of first and second print engines 58, 64 which are synchronized by a controller 80. Controller 80 may be a computer, a microprocessor, an application specific integrated circuit, digital circuitry, analog circuitry, or any combination and/or plurality thereof. In this embodiment, the controller 80 includes a first controller 82 and a second controller 84. Optionally, in other embodiments, the controller 80 could be a single controller as indicated by the dashed line for controller 80. The first print engine 58 has a first primary imaging member (PIM) 86, the features of which have been discussed above with regard to the PIM of FIG. 1. The first PIM 86 also preferably has a plurality of frame markers corresponding to a plurality of frames on the PIM 86. In some embodiments, the frame markers may be holes or perforations in the PIM 86 which an optical sensor can detect. The frame markers may be reflective or diffuse areas on the PIM, which an optical sensor can detect. Other types of frame markers will be apparent to those skilled in the art and are intended to be included within the scope of this specification. The first print engine 58 also has a first motor 88 coupled to the first PIM 86 for moving the first PIM when enabled. As used here, the term "enabled" refers to embodiments where the first motor 88 may be dialed in to one or more desired speeds as opposed to just an on/off operation. Other embodiments, however, may selectively enable the first motor 88 in an on/off fashion or in a pulse-width-modulation fashion.

The first controller 82 is coupled to the first motor 88 and is configured to selectively enable the first motor 88 (for example, by setting the motor for a desired speed, by turning the motor on, and/or by pulse-width-modulating an input to the motor). A first frame sensor 90 is also coupled to the first controller 82 and configured to provide a first frame signal, based on the first PIM's plurality of frame markers, to the first controller 82.

A second print engine 64 is coupled to the first print engine 58, in this embodiment, by a paper path 92 having an inverter 94. The second print engine 64 has a second primary imaging member (PIM) 96, the features of which have been discussed above with regard to the PIM of FIG. 1. The second PIM 96 also preferably has a plurality of frame markers corresponding to a plurality of frames on the PIM 96. In some embodiments, the frame markers may be holes or perforations in the PIM 96, which an optical sensor can detect. In other embodiments, the frame markers may be reflective or diffuse areas on the PIM which an optical sensor can detect. Other types of frame markers will be apparent to those skilled in the art and are intended to be included within the scope of this specification. The second print engine 64 also has a second motor 98 coupled to the second PIM 96 for moving the second PIM 96 when enabled. As used here, the term "enabled" refers to embodiments where the second motor 98 may be dialed in to one or more desired speeds as opposed to just an on/off operation. Other embodiments, however, may selectively enable the second motor 98 in a pulse-width-modulation fashion.

The second controller 84 is coupled to the second motor 98 and is configured to selectively enable the second motor 98 (for example, by setting the motor for a desired speed, or by pulse-width-modulating an input to the motor). A second frame sensor 100 is also coupled to the second controller 84 and configured to provide a second frame signal, based on the second PIM's plurality of frame markers, to the second controller 84. The second controller 84 is also coupled to the first frame sensor 90 either directly as illustrated or indirectly via the first controller 82 which may be configured to pass data from the first frame sensor 90 to the second controller 84.

While the operation of each individual print engine 58 and 64 has been described on its own, the second controller 84 is also configured to synchronize the first and second print engines 58, 64 on a frame-by-frame basis. Optionally, the second controller 84 may also be configured to synchronize a first PIM splice seam from the first PIM 86 with a second PIM splice seam from the second PIM 96. In the embodiments that synchronize the PIM splice seams, the first print engine 58 may have a first splice sensor 102 and the second print engine 64 may have a second splice sensor 104. In other embodiments, the frame sensors 90, 100 may be configured to double as splice sensors. This method can be applied to other problem areas besides seams, such as non-printable areas that the image would not print on well or at all. Another example of a black and white area is one that has a defect or flaw or even a cutout or hole punch. Other examples include preprinted areas and different surfaces, such as a plastic overlay. A black and white area could even be an area that a customer wanted left blank for some other reason and could be printed if desired.

In one embodiment the timing of the PIMs in each of the several print engines is monitored. Timing errors of the PIMs are then determined. There may be additional modules such as a module to invert a receiver, referred to as an inverter, between sequential print engines, also referred to as the several print engines of which the digital print engine is comprised. The variation of the actual timing of a frame of the second print engine from the target time from the desired frame in the first print engine for a pair of sequential print engines, determining if the variation in the actual timing is within a predetermined error tolerance and if the actual timing is outside the predetermined error tolerance, the error is flagged then measuring a second variation of the actual timing of a sequential frame of the second print engine from the target time from the desired sequential frame in the first print engine.

If the actual timing of the sequential frame is outside the predetermined error tolerance, printing is stopped. If desired, more than two variations can be programmed into the LCU before printing is stopped. Moreover, the variations need not be immediately sequential. Rather, a predetermined number of cycles of a print engine may occur before variations in the timing are determined. It is preferred not to have more than 10 errors flagged as an error limit; before stopping printing or to have more than 10 cycles of the digital print engine occur before determining whether or not an error has occurred as substantial damage may occur if such lengthy delays before printing is stopped are implemented. In one mode of operation, between three and five errors are flagged as the error limit; before the machine is stopped. This allows repeated confirmation of an error. However, if the error is flagged even twice, it may be beneficial to stop the machine. It should be noted that increasing the number of flagged errors as an error limit; before the machine is stopped increases the risk of damaging the machine. Under no circumstances should more than ten errors be flagged before the engine is stopped. Similarly, it is preferable to determine whether or not the machine should be stopped within two to five cycles, not to exceed ten cycles, to prevent machine damage should there be a timing error. It is preferable to determine whether the machine has a timing error and has to be stopped within 3 cycles. It is important to note that determining the error limit at a scheduled event in a printer cycle such as after an initial number of rotations of the PIM after an initial start up or during the printing run or after a printing run. It could even be between printing cycles to improve printing efficiencies. This is programmable and can be set as one of a range of values including delay time, delay sheets, or other related to the parameters that effect printing such as environmental factors. For instance of the temperature was not under the prescribed temperature the program could wait to start counting the error limits until it was at the required temperature.

This method of improving the synchronization of the timing of a plurality of physically coupled print engines involves detecting and eliminating misleading indications of a non-synchronized print engine that are essentially minimal variations caused by torque disturbances, power line voltage or frequency variations, etc. These can be especially problematic if there is a signal to the logic and control unit (LCU) indicating that a speed variation is sufficiently large or if a signal is reported that a module, operating within its speed specifications but near the end the limit of that specification, had been subjected to a small incremental change in module speed resulting in that module operating outside its specifications. The method uses a chosen number of consecutive changes in the time delay to result in the time delay of the receiver being handed off from one engine or module to a sequential engine or module before a machine error is declared. By counting the error limits to yield a total the error limit number and if the error limit number exceeds a timing tolerance then a decision is made and/or a signal sent to not to use the error limit as meaningful data in the operation of the printer including during the synchronization process. In one embodiment the signal generated that would cause the electrophotographic engine to stop is overruled by a specified error limit less then ten when counted as the total error limit number from ten sequential frames. In another embodiment the signal generated that would cause the electrophotographic engine to stop is overruled by an error limit number that is less then an actual number of sequential frames when the error limit number is the total number of error limits recorded from that number of sequential frames.

The method of synchronizing the timing of a plurality of physically coupled print engines minimizes primary imaging member timing errors by determining a target time using a position of one or more timing marks on a first primary imaging member in a first print engine having a first timing, directing a receiving sheet from the first print engine to a second primary imaging member in a second print engine having a second timing to calculate a nominal arrival time of the receiving sheet relative to a fixed position in the second print engine. Then the variation of the actual timing using a nominal arrival time of a fixed point, such as a frame of the second print engine, from the target time in the first print engine and determining if the variation in the actual timing is within a predetermined error tolerance and if the actual timing is outside the predetermined error tolerance, the error is flagged. Additional variations of the actual timing of sequential frames of the second print engine from the target time from the desired sequential frames in the first print engine and these variations are measured and/or flagged and if the variations exceed a threshold, such as the total time exceeds the timing tolerances, then generating a signal not to use the detected minimal variation to synchronize the position of the primary imaging member in a first engine. This method can set a threshold tolerance based on timing error between 2 and 10 determinations of the timing error between 2 and 10 sequential frames. The signal can be generated by the first print engine arises from the position of the primary imaging member in the first print engine and can stop the engine if needed.

The invention has been described in detail with particular reference to certain preferred embodiments thereof, but it will be understood that variations and modifications can be effected within the spirit and scope of the invention.

What is claimed is:

1. A method of synchronizing the timing of a plurality of physically coupled print engines by minimizing primary imaging member timing errors that are misleading indications during synchronization, the method comprising:

determining a target time using a position of one or more timing marks on a first primary imaging member in a first print engine having a first timing;

directing a receiving sheet from the first print engine to a second primary imaging member in a second print engine having a second timing;

calculating a nominal arrival time of the receiving sheet relative to a fixed position in the second print engine;

measuring an actual timing variation using the nominal arrival time of the second print engine and the target time in the first print engine;

determining if the actual timing variation is within a predetermined error tolerance and if not, an error is flagged as an error limit; and counting the error limits to yield a total an error limit number and if the error limit number exceeds a timing tolerance, generating a signal not to use the information that generated the error limit.

2. The method according to claim 1 wherein the error limit number comprises between 2 and 10 error limits.

3. The method according to claim 1 wherein the error limit number is determined from two or more frames in ten sequential frames.

4. The method according to claim 1 wherein the signal is generated by the first print engine due to the error limit that arises from at least in part due to the position of the primary imaging member in the first print engine.

5. The method according to claim 1 wherein a signal is generated that causes a print engine to stop when two or more errors are flagged as an error limit, and wherein the signal error limit flag is overruled by a specified error limit less than an actual number of sequential frames.

6. The method according to claim 1 wherein the error limit arises from at least in part due to minimal variations caused by disturbances to the printer that can occur including disturbances due to one or more of torque disturbances, power line voltage and frequency variations.

7. The method according to claim 1 wherein the error limit arises from at least in part due to operating near an end limit of a speed specification and the error limit is a small incremental change that would result in an error limit.

8. The method according to claim 1 further comprising determining the error limit at a scheduled event in a printer cycle.

9. The method according to claim 8 wherein that event is after an initial number of rotations of a primary imaging member after an initial start up.

10. The method according to claim 8 wherein the event is programmable based on a range of values.

11. A method of synchronizing the timing of a plurality of physically coupled print engines by minimizing primary imaging member timing errors that are misleading indications during synchronization, the method comprising:

determining a target time using a position of one or more timing marks on a first primary imaging member in a first print engine having a first timing;

directing a receiving sheet from the first print engine to a second primary imaging member in a second print engine having a second timing;

calculating a nominal arrival time of the receiving sheet relative to a fixed position in the second print engine;

measuring an actual timing variation using the nominal arrival time of the second print engine and the target time in the first print engine;

determining if the actual timing variation is within a predetermined error tolerance and if not, an error is flagged as an error limit;

measuring an additional actual timing variation of one or more sequential frames of the second print engine; and summing the absolute values of two or more actual timing variations to yield a total timing variation and if the total timing variation does not exceed a total timing tolerance, generating a signal not to use the information that generated the error limit.

12. The method according to claim 11 wherein the summing step comprises the summation of between 2 and 10 error limits determinations calculated using results from two or more frames in ten sequential frames.

13. The method according to claim 11 wherein a signal is generated that causes a print engine to stop when two or more errors are flagged as an error limit, and wherein the signal error limit flag is overruled by a specified error limit less than an actual number of sequential frames.

14. The method according to claim 11 further comprising starting the summing step at a scheduled event in a printer cycle.

15. The method according to claim 14 wherein that event is after an initial number of rotations of a primary imaging member after an initial start up.

16. The method according to claim 11 wherein a signal is generated that causes a print engine to stop when two or more errors are flagged as an error limit, and wherein the signal error limit flag is overruled based on the summing step.

17. The method according to claim 11 wherein the signal is generated due to the error limit that arises from at least in part due to minimal variations caused by disturbances to the printer that can occur including disturbances due to one or more of torque disturbances, power line voltage and frequency variations.

18. The method according to claim 11 wherein the signal is generated at least in part due to operating near an end limit of a speed specification such that a small incremental change that would result in an inappropriate shut-down of the printer that would effect a printer efficiency.

19. An electrophotographic print apparatus including a plurality of physically coupled print engines that minimize errors due to misleading indicators during synchronization, the apparatus comprising:

a plurality of coupled electrophotographic print modules, each module including a primary imaging member, wherein the position of the primary imaging member in a second print engine is synchronized to the position of the primary imaging member in a first engine by a signal generated by the first print engine;

a comparator to compare a target time, using a position of one or more timing marks on a first primary imaging member in a first print engine having a first timing, to a nominal arrival time the receiving sheet arrives at a fixed position in the second print engine; to measure a variation of the actual timing using the nominal arrival time of the second print engine from the target time in the first print engine;

an error flag that is activated if it is determined the timing is outside the predetermined error tolerance, the error is flagged an error limit;

a counter that counts the error limits to yield a total an error limit number and if the error limit number exceeds a timing tolerance, generating a signal not to use the information that generated the error limit.

20. The apparatus according to claim 19 wherein the signal is generated when the error limit number comprises between 2 and 10 error limits determined from two or more frames in ten sequential frames.

* * * * *